UNITED STATES PATENT OFFICE.

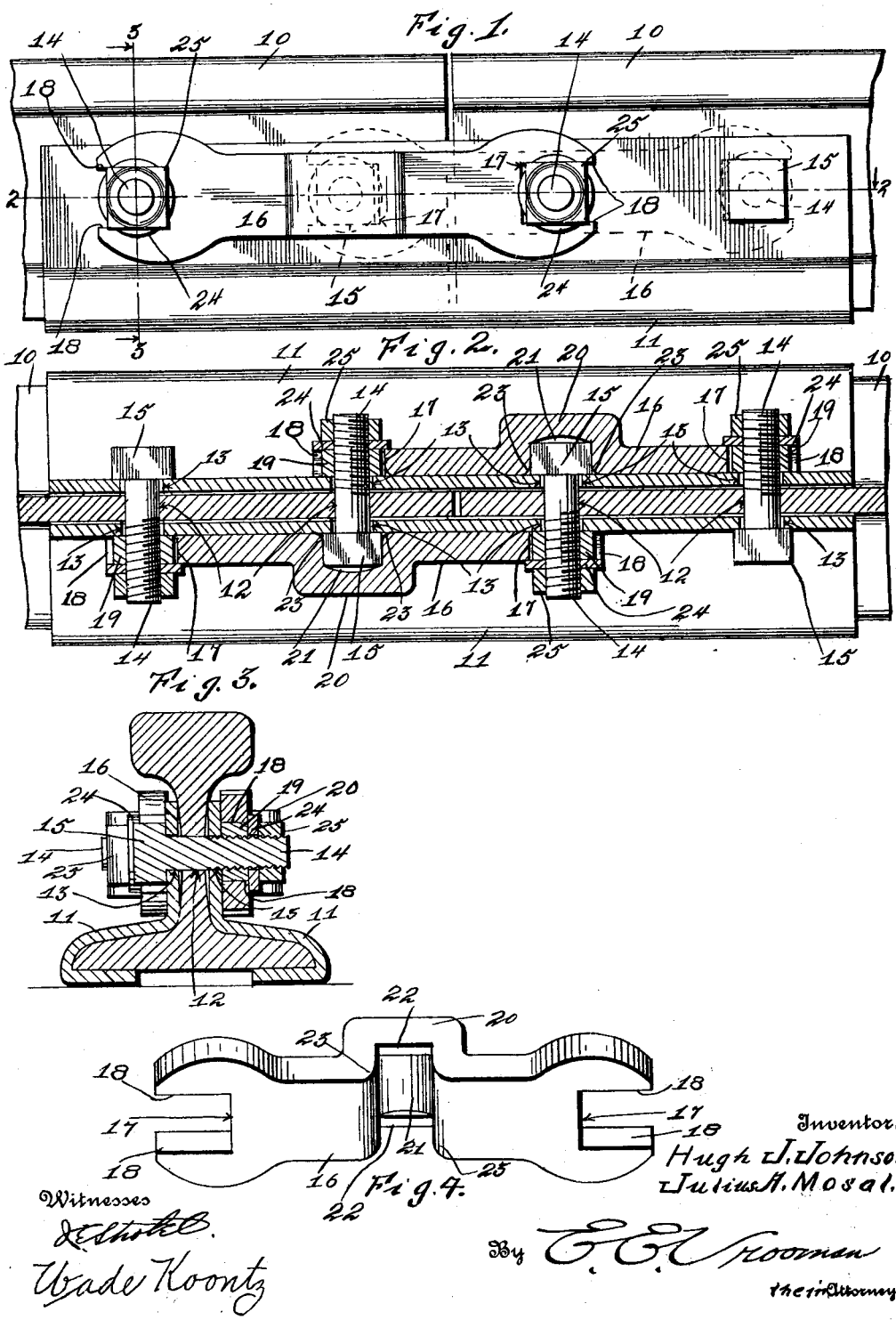

HUGH J. JOHNSON AND JULIUS A. MOSAL, OF JACKSON, MISSISSIPPI.

NUT-LOCK.

1,136,234.  Specification of Letters Patent.  Patented Apr. 20, 1915.

Application filed September 27, 1913. Serial No. 792,238.

*To all whom it may concern:*

Be it known that we, HUGH J. JOHNSON and JULIUS A. MOSAL, citizens of the United States, residing at Jackson, in the county of Hinds and State of Mississippi, have invented certain new and useful Improvements in Nut-Locks, of which the following is a specification, reference being had therein to the accompanying drawing.

This invention relates to nut locks and relates more particularly to that class of nut locks which prevent nuts from working loose on rail joints.

The object of this invention is to provide a device that will prevent nuts from working loose when they are positioned in alinement.

Another object of this invention is to produce a novel and efficient locking plate that is adapted to lie flat against the ordinary fish plate of a rail joint.

With these and other objects in view this invention consists of certain novel combinations, constructions and arrangements of parts as will be hereinafter fully described and claimed.

In the accompanying drawing: Figure 1 is a side elevation of a rail joint with our improved nut lock mounted thereon. Fig. 2 is a section taken on the line 2—2 of Fig. 1. Fig. 3 is a section taken on the line 3—3 of Fig. 1. Fig. 4 is a perspective view of a locking plate used in connection with this invention.

Referring to the parts by reference numerals 10 denotes the rails connected by the ordinary fish plates 11, said rails having openings 12 positioned in alinement with openings 13 of the fish plates 11. Passing through the alined openings 12 and 13 are bolts 14 provided with heads 15 at one end. Positioned flat against the fish plates 11 is a locking plate 16 that has the notches 17 in each end, said notches provided with squared faces 18 that are adapted to engage the sides of the nuts 19 that are threaded on the bolt 14. Intermediate the length of the plate 16 is a struck-up portion 20 which forms a pocket 21 and has on its sides depending flanges 22. The corners of this pocket 21 are rounded as at 23 to facilitate the placing of the heads 15 therein. It will be seen that these heads 15 are gripped on all sides when positioned in the pocket 21 by means of the side faces of the pocket and the downwardly projecting flanges 22. To prevent the accidental removal of this locking plate 16 from the fish plates 11 a washer 24 is positioned on the bolt 14 and is held thereon by the jam nut 25.

It is obvious that by positioning the flanges over the head of a bolt foreign objects will be prevented from passing into the pocket between the head of the bolt and the inner portions of the pocket. Therefore it will be impossible for a foreign object to accidentally force the locking plate from engagement with the nuts and bolt heads.

It is obvious that minor changes may be made in the form and construction of this invention without departing from the spirit thereof. It is therefore not wished to confine the invention to the exact form herein shown and described, but it is wished to include all such as properly come within the scope claimed.

What is claimed, is:

A one-piece locking plate formed to constitute a rigid construction having an up-struck portion intermediate its ends thereby forming an enlarged pocket, side flanges formed integral upon the up-struck portions and extending into said pocket, said plate provided with squared notches at its end portions, said notches adapted to receive nuts for holding the nuts against rotation, means for retaining said plate in position, said pocket being adapted to receive the head of a bolt, said flanges fitting upon the side portions of the head of the bolt whereby said flanges will prevent foreign objects from passing downwardly into the pocket between the head of the bolt and the inner portions of the pocket thereby holding the plate from being sprung from engagement with the nuts and the head of the bolt by a foreign object.

In testimony whereof we hereunto affix our signatures in presence of two witnesses.

HUGH J. JOHNSON.
JULIUS A. MOSAL.

Witnesses:
 H. C. SAVAGE,
 W. A. CONNLEY.

Copies of this patent may be obtained for five cents each, by addressing the "Commissioner of Patents, Washington, D. C."